United States Patent [19]
Röhm

[11] Patent Number: 4,872,691
[45] Date of Patent: Oct. 10, 1989

[54] LATHE CHUCK

[76] Inventor: Günter H. Röhm, Heinrich-Röhm-Strasse 50, D-7927 Sontheim, Fed. Rep. of Germany

[21] Appl. No.: 226,325

[22] Filed: Jul. 29, 1988

[30] Foreign Application Priority Data

Aug. 12, 1987 [DE]  Fed. Rep. of Germany ....... 3726773

[51] Int. Cl.$^4$ ............................................. B23B 31/16
[52] U.S. Cl. ..................................... 279/123; 279/110
[58] Field of Search ......................... 279/110, 117, 123

[56] References Cited

U.S. PATENT DOCUMENTS

| | | | |
|---|---|---|---|
| 3,682,491 | 8/1972 | Sakazaki et al. | 279/1 |
| 4,026,566 | 5/1977 | Rohm | 279/123 X |
| 4,243,237 | 1/1981 | Rohm | 279/110 X |
| 4,270,763 | 6/1981 | Rohm | 279/110 X |
| 4,352,500 | 10/1982 | Blattry et al. | 279/123 X |
| 4,362,306 | 12/1982 | Rohm | 279/123 X |

FOREIGN PATENT DOCUMENTS

2711904  9/1978  Fed. Rep. of Germany ...... 279/110

*Primary Examiner*—Steven C. Bishop
*Attorney, Agent, or Firm*—Herbert Dubno

[57] ABSTRACT

In a lathe chuck, the jaws consist of two jaw segments, couplable with each other in different relative positions by means of a coupling member operatively linked to an actuating member by way of a positioning assembly. A latching assembly is provided for fixing in place the forward jaw part while the rearward jaw part is being moved. The latching assembly, the actuating member, and the positioning assembly are all adjustable in a linked relation to one another, so that the chuck span of the chuck jaws is automatically adjustable by the actuating member.

11 Claims, 7 Drawing Sheets

LATHE CHUCK

FIELD OF THE INVENTION

My present invention relates to a lathe chuck, in particular to a lathe chuck with radially adjustable chuck jaws and means for adjusting the span thereof.

BACKGROUND OF THE INVENTION

Lathe chucks generally have chuck jaws in the chuck body which are positionable in a direction radial to the chuck axis. It is also known to have the chuck jaws comprise two jaw segments, located one behind the other in the axial direction, these chuck jaws being movable in opposition to each other to various positions less than the maximum span of the chuck, in order to change the span of the chuck. It is further known to have the two jaw segments coupled with one another, and also to have a actuating member located axially in the chuck body and corresponding to the maximum possible span of the chuck, this actuating member being operatively connected to each axially rearward jaw segment and also having a positioning assembly for positioning the coupling member between two end positions, corresponding to the coupled and decoupled state of the jaw segments.

Lathe chucks of this type are disclosed, for example, in U.S. Pat. No. 3,682,491 and they make possible the convenient adjustment of chuck span, since in this case only the forward jaw segments are moved in the aforementioned decoupled state with respect to the rearward jaw segments. However, in the known lathe chucks, this movement can only be done manually and individually, one jaw at a time.

OBJECTS OF THE INVENTION

It is an object of the invention to make available a lathe chuck of the above-described type wherein automatic span setting is possible.

It is a further object to make available a lathe chuck where all the jaws may be set simultaneously, and where the jaws are held in position until the desired change is to be made.

It is a further object to make available a lathe chuck where an individual cylinder-piston assembly can adjust all the jaws.

SUMMARY OF THE INVENTION

These and other objects are achieved in accordance with the present invention by providing a lathe chuck which has a chuck body, attached to which are two or more chuck jaws positioned so as to be movable radially with respect to the axis of the chuck body, each of the chuck jaws having two jaw segments lying one behind the other in relation to the chuck axis, these jaw segments being displaceable with respect to one another so as to change the clamping span of the chuck (these displacements being less than the maximum possible span of the chuck jaws).

The two segments of each jaw have a coupling member arranged so as to permit coupling of the two jaw segments, a actuating member being provided axial to the chuck and displaceable to the maximum possible stroke of the chuck jaws, this actuating member being operatively linked to each of the rearward jaw segments. The chuck also has a positioning assembly for positioning this coupling member between the two limiting positions corresponding to the coupled and decoupled condition of the jaw segments, and, as a novel feature of the chuck, a latching assembly is provided for fixing (holding in place) the forward jaw segments with respect to the chuck, this latching assembly, the actuating member for the jaws, and the positioning assembly all being controllable cooperatively.

When the actuating member executes a back-and-forth motion with a stroke the distance of which corresponds to the distance that each rearward jaw segment must move to make possible the coupling of the jaw segments, then by means of this motion, the coupling member is, in one of the stroke directions, coupled and, in the other stroke direction, decoupled, and during the stroke when the coupling member is decoupled, the forward jaw segment is held fixed to the chuck body.

The result of this arrangement in accordance with the invention is that the forward jaw segment with the help of the rearward jaw segment can be positioned separately relative to the rearward jaw part, so that the actuating member not only serves for clamping and loosening of the jaw of the chuck but serves also for automatic changing of the jaw span.

The forward jaw segment is thereby shifted in the chuck body relative to the rearward jaw segment by a step which corresponds to the distance between the positions at which both jaw segments are coupleable with one another. Starting out from a desired position of the forward jaw part, while the segments are decoupled, the rearward jaw segment is shifted and then, when in the shifted position, again coupled with the forward jaw part.

The rearward jaw segment can again be restored to the starting position, taking the forward jaw segment along with it. By repetition of this process, the jaw segments can be positioned along the entire possible range of their positions. A positioning drive independent from the clamping drive is not required.

In a preferred embodiment of the invention, the coupling members are axially-slideably constrained coupling bolts in the rearward jaw part, bearing a toothed rack which in the coupled condition engages with a toothed rack on the forward jaw part. The distance between the positions in which both jaw segments are coupleable with one another is then, in each position over the total span of the chuck, equally large, and is equal to the tooth distance of the toothed rack of the coupling member and of the corresponding toothed rack of the front jaw part, or to a whole number multiple thereof. The working range of positions is larger, the longer the extent of the toothed rack on the forward jaw part.

In regard to the positioning assembly for the coupling member, several embodiments are possible. A very advantageous embodiment is characterized by having the positioning assembly for positioning the coupling member in the form of a coaxial positioning ring which is rotatably constrained in the chuck body, this ring being linked flexibly with a positioning rod which is located tangentially in the chuck body, this positioning rod being slidable and positionable by a cylinder-piston assembly which impinges upon both sides of the positioning rod, this ring also bearing a position-controlling wedge for each of the coupling members, this wedge serving to move the coupling member into the coupled position against the pressure of a position-restoring spring when the positioning ring is rotated. This embodiment has the advantage that a single cylinder-piston arrangement suffices to activate all of the coupling members and in the coupled-in condition, the coupling members are latched by the positioning ring.

Another very advantageous embodiment of the invention is characterized by having the positioning assembly for each of the coupling members provided with its own displaceable positioning rod, this positioning rod being constrained in the chuck body perpendicular to the axis of the chuck, and the positioning rod being slidable by a cylinder-piston assembly impinging on the rod from both sides. The positioning rod is operatively linked by way of a beveled coupling to the coupling member which is radially slidable over the range of motion of the clamping jaw. All of the cylinder-piston assemblies are commonly controllable.

The ends of the coupling members connected to the positioning rods extend into the region of the positioning rods in recesses of the chuck body, which makes possible the radial sliding of the coupling member to the extent of the full range of motion of the chuck.

The range of motion of the actuating member required for the setting of the working span of the chuck is smaller than the maximum possible span of the chuck, and must correspond as exactly as possible to the positioning distance at which both jaw segments of each clamping jaw are couplable with one another. This can be achieved either by a correspondingly exact control of the motion of the actuating member or more simply by providing a projection which limits the motion of the actuating member during setting of the working region.

According to another feature of the invention, the path of motion of the actuating member in the chuck body is provided with a detent which limits the stroke of the actuating member to that distance between the positions of the rearward jaw segment which permit coupling of the two jaw segments. If the actuating member is formed as a actuating piston, in a manner in itself known in the art, then a beveled clutch is advantageously provided to link this actuating piston to the rearward jaw part, and the detent is advantageously formed as a slidably constrained pin, this pin being axially positioned against the actuating member and constrained in the chuck body so as to be slidable perpendicular to the chuck axis; this pin; when in its free position at the maximum possible range of motion, penetrates into a groove defined in the actuating member of the angular clutch, and conversely, at its other position, the pin impinges against the actuating piston. For positioning of this detent (pin), there is provided a controllable cylinder-piston assembly and a restoring spring against the force of which the assembly moves.

In regard to latching assemblies, several embodiments are suitable, each fitted to the form of the positioning arrangement for the coupling member.

If this positioning arrangement employs a positioning ring, as described above, then an advantageous latching assembly for each of the chuck jaws comprises a latching rod, slidably constrained in the chuck body perpendicular to the axis, with a latching pin on the latching rod, this pin penetrating from the side into the toothed rack on the forward jaw part, and a latch actuating rod constrained slidably axially in the chuck body provided for moving the latching rod, the latch actuating rod being in turn movable by the positioning ring.

The latching pin and the driving rod are advantageously linked operatively by a beveled clutch, and a wedge drive is provided to link the latch actuating rod and the positioning ring, this wedge drive comprising an angular tooth on the positioning ring and an angular groove in the driving rod into which the angular tooth penetrates. The advantage of this arrangement is that the latching rod and the latching pin are coupled in an efficacious way with the positioning ring, thus the position of the latching pin is unambiguously determined by the rotational position of the positioning ring.

If no positioning ring is present, and thus each coupling member has its own positioning rod, then an advantageous embodiment of the invention is characterized by having a latching assembly for each of the jaws which comprises a latching rod constained in the chuck body slidably, against the restoring force of a spring, perpendicular to the axis of the chuck body, with a latching pin attached to the latching rod and the latching pin penetrating from the side into the toothed rack on the forward jaw part.

The latching rod is supported against a actuating bolt by way of a beveled clutch, this actuating bolt being constrained axially slidable in the chuck body, this actuating bolt being movable radially over the range of motion of the chuck jaw and being supported against a positioning bolt which is parallel to the actuating bolt and constrained slidably in the rearward jaw part, and a further actuating member being provided to couple the coupling member with the positioning bolt. In this manner, the positioning of the latching rod and of the latching pin is made directly dependent on the positioning of the coupling member.

In a feature of the invention, the actuating member is a control bolt slidably constrained in the rearward jaw segment parallel to the latching rod, the control bolt abutting against, on one side, the axially-movable coupling member, and on the other side, against the positioning bolt, which by way of beveled clutches operatively links the control bolt and the positioning bolt, these beveled clutches being so arranged that the axial positioning of the coupling member leads to concurrent positioning of the positioning bolt, and the axial positioning of the actuating bolt pushes the latching pin into the toothed rack.

BRIEF DESCRIPTION OF THE DRAWING

The above and other objects, features and advantages of the present invention will become more readily apparent from the following description, reference being made to the accompanying highly diagrammatic drawing in which.

SPECIFIC DESCRIPTION

In the chuck body 1 there are three chuck jaws 2 positionable radially with respect to the chuck axis. The chuck body 1 is adapted on its rear side for attachment to a rotating spindle which is not shown, this adapting being done in the usual manner by provision of a recess 3 and axial attachment bolts 4. As driving means for the chuck jaws 2 there is provided a actuating member 5 which is shaped as a chuck piston which can be attached by way of a screwthread or threaded bushing 6 to a lathe shank (also not shown) which runs through the hollow rotating spindle. The actuating member 5 is linked to the lathe chuck 2 by way of a wedge clutch 7.

In each of the figures, the axially most-forward position of the actuating member 5 is depicted, which in reference to the chuck jaws 2 corresponds to the radially-outermost position of their clamping stroke. If the actuating member 5 in the figure moves to the left, then the chuck jaws 2 move inward. Each chuck jaw 2 consists of two jaw segments 2.1 and 2.2 which lie one behind the other in the direction of the chuck axis and each is constrained in the chuck body 1. Only the rearward jaw segment 2.2 is linked to the actuating member 5.

Both jaw segments 2.1 and 2.2 of each chuck jaw 2 can be slid against one another for purposes of changing the jaw span or for exchange of the forward jaw segment 2.1, and may be coupled to one another by a coupling member 8, in regard to which the figure shows the coupled condition.

The coupling of both jaw segments 2.1 and 2.2 with one another is only possible if both jaw segments are located in a selected position with respect to one another, differing in separation from each other always by less than the maximum possible jaw stroke. This distance, in the present example, is equal to the tooth distance of one of the toothed racks 9 provided on the face of the coupling member 8 and the corresponding teeth 10 provided on the forward jaw segment 2.1. In this embodiment, the coupling members 8 are axially positionable constrained bolts in the rearward chuck segments 2.2. The coupling members 8 are provided, as means for coupling and uncoupling, with a positioning member 11 which will be further described hereinafter.

Furthermore, a position-maintaining (latching) member 12 is provided to fix in position the forward jaw segment 2.1 in the chuck body 1. This position-maintaining member 12, and also the actuating member 5 for the chuck jaws 2 and the positioning member 11 for the coupling member 8 are adjustable in conjunction with one another in such a way that the actuating member 5 carries out a back-and-forth movement with a stroke which corresponds to the distance between the positions of the rearward jaw segment 2.2 possible for the coupling of both jaw segments 2.1 and 2.2., or to a whole-number multiple of this distance. In this way, the coupling member 8 is coupled in by one of the stroke directions and decoupled by the other stroke direction.

Moreover, during the moving stroke with the coupling member 8 uncoupled, the forward jaws 2.1 are fixed. If in the embodiment illustrated in the drawing, both jaw segments 2.1 and 2.2 of each chuck jaw 2 are uncoupled and the forward jaw segments 2.1 are fixed, then consequently the rearward jaw segments 2.2 by activation of the actuating member 5 move inwards radially by one tooth distance and then are recoupled with the forward jaw segments 2.1, so that the relative position of both jaw segments 2.1 and 2.2 with respect to one another and, therewith, the chuck span, is changed by one tooth distance. Upon pushing back the actuating member 5 and the rearward jaw segments 2.2 into the starting position, the forward jaw segments are correspondingly carried along. Changes of the chuck diameter by several tooth distances thus can be effected by the corresponding number of repetitions of the aforedescribed procedure, to obtain the desired enlargement of the chuck diameter.

Figure 1:
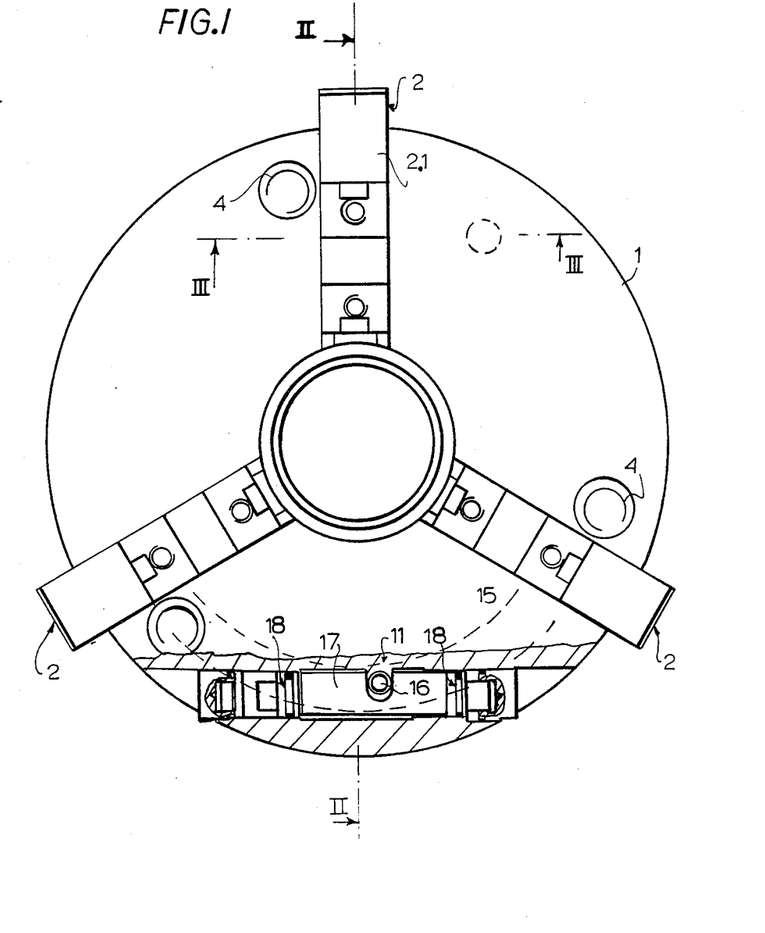
FIG. 1 is a front view of a lathe chuck in accordance with the invention, partly shown in cross-section.
Figure 2:
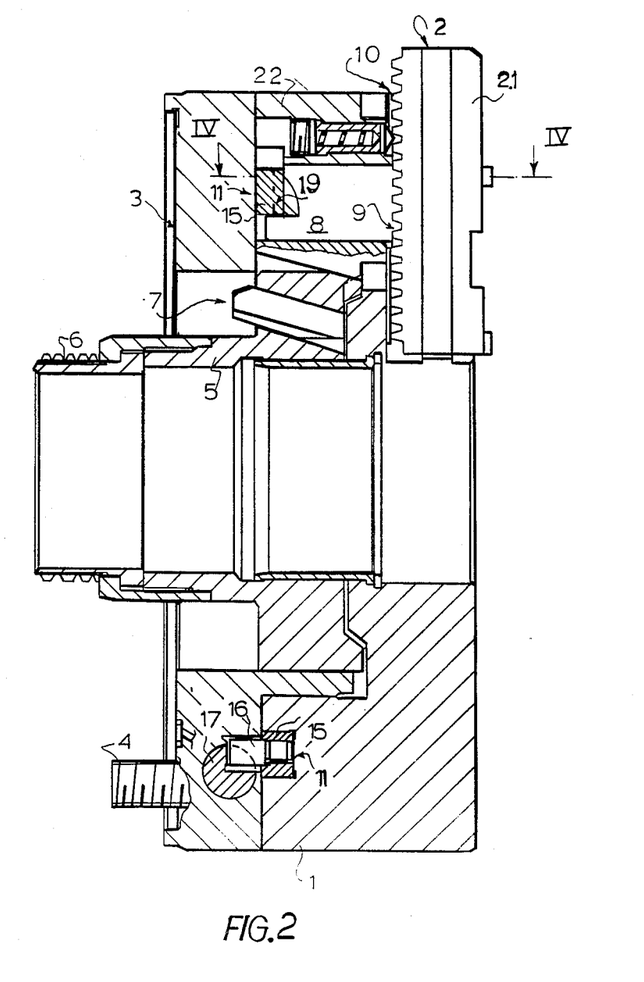
FIG. 2 is a view of the section in the direction II—II as shown in FIG. 1.
Figure 3:
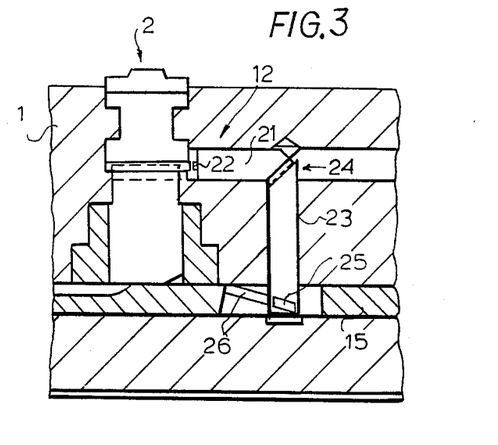
FIG. 3 is a view of the section III—III as shown in FIG. 1.
Figure 4:
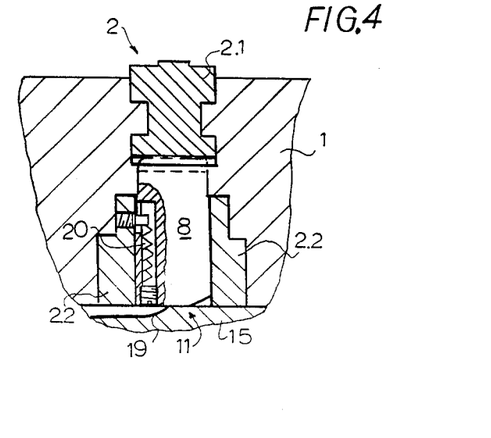
FIG. 4 is a view of the section IV—IV as shown in FIG. 2.
Figure 5:
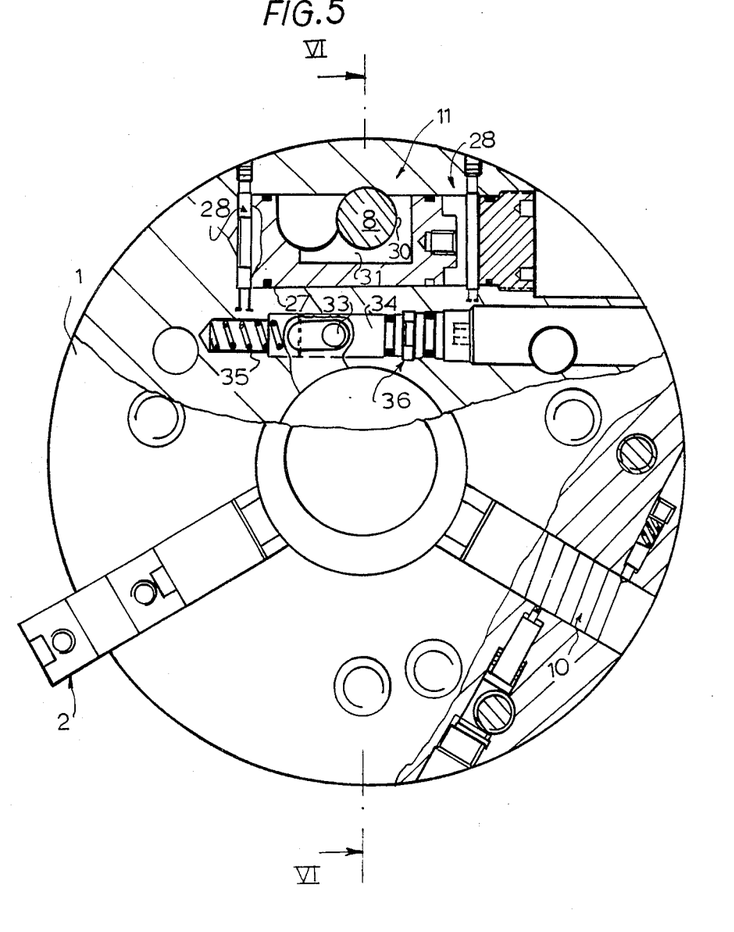
FIG. 5 is a view of another embodiment of the lathe chuck in accordance with the invention, partly shown in section.
Figure 6:
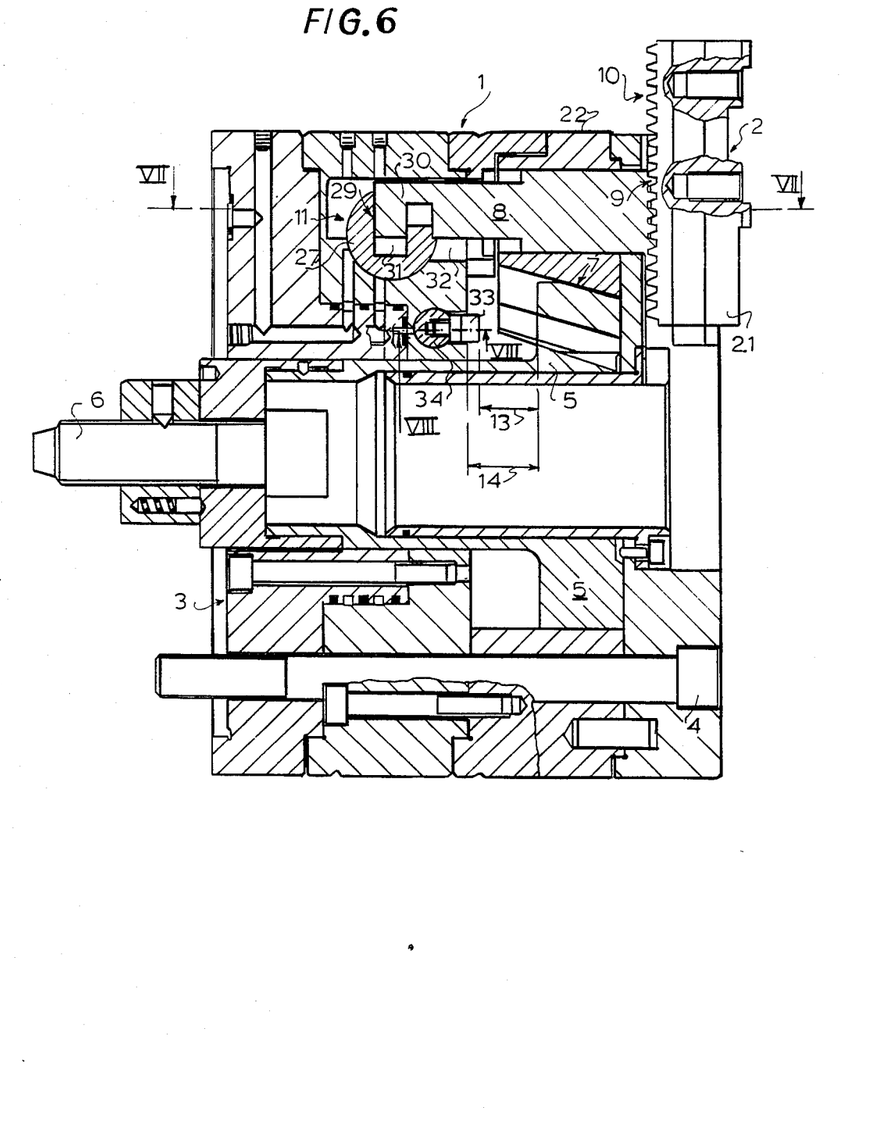
FIG. 6 is a view of the section VI—VI in FIG. 5.
Figure 7:
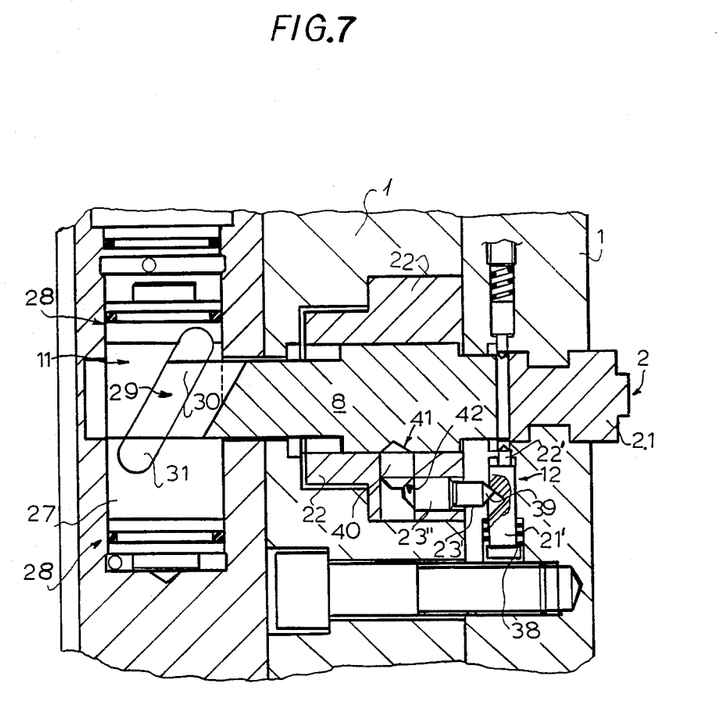
FIG. 7 is a view of the section VII—VII in FIG. 6.
Figure 8:
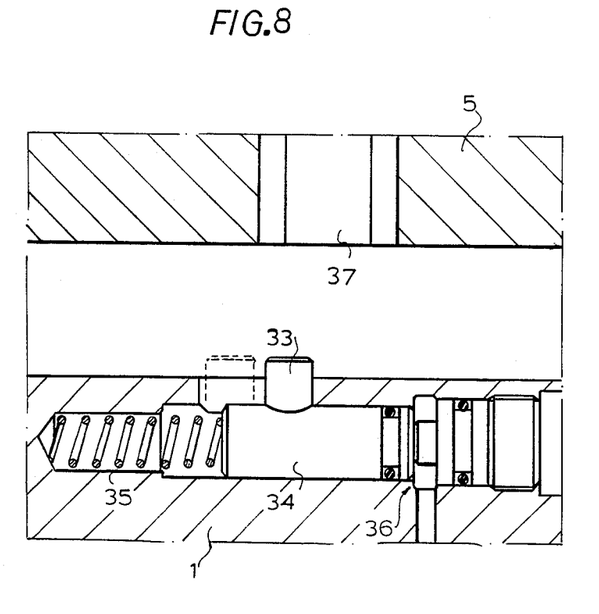
FIG. 8 is a view of the section VIII—VIII in FIG. 6.

If, on the other hand, the chuck diameter is to be reduced, then, starting again from the condition depicted in the figure, the actuating member 5 is first moved to the left with the jaw pieces 2.1 and 2.2 coupled, whereupon both jaw segments move together radially inward by one tooth distance. Then the jaw segments are uncoupled, the forward jaw segment 2.1 fixed in position, and the actuating member 5 with the rearward jaw segment 2.2 moved back into the starting position, whereby the rearward jaw segment 2.2 is pushed radially outward by one tooth distance. If finally, both jaw segments 2.1 and 2.2 are coupled with one another, then the net result is that the chuck diameter has been reduced by one tooth distance. Also in this case, larger changes of the chuck diameter can be accomplished by repetition of the above-described procedure. The required chuck stroke to carry out this adjustment is shown by the double arrow 13 in FIG. 6. The stroke of the actuating member 5 required for enlarging the chuck span is shown in FIG. 6 by the double arrow 14.

In the example depicted in FIGS. 1 to 4, the positioning member 11 for the coupling member 8 comprises a coaxial rotatably constrained positioning ring 15 in the chuck body 1, which by way of a cylindrical engaging roller 16 engages flexibly and penetratingly with a positioning rod 17 which is held tangentially constrained in the chuck body 1 and which is positionable by means of piston-cylinder assemblies 18 which press on the rod 17 from both sides. The positioning ring 15 has, for each coupling member 8, a controlling bevel 19, by means of which, upon rotation of the positioning ring 15, the coupling members 8 are displaced into the coupling position against the force of restoring springs 20. In this coupled position, the coupling members 8 are also blocked off by the positioning ring 15.

The position-maintaining assemblage 12 comprises, for each chuck jaw 2, a latching rod 21 constrained in the chuck body 1 perpendicular to the chuck axis, bearing a latching pin 22 which penetrates from the side into the toothed rack 10 of the forward jaw segment 2.1. This rod 21 can be pushed by a latch actuating rod 23 which is constrained in a channel axially oriented in the chuck body 1, this rod in turn being positioned by the positioning ring 15. Furthermore, the latching rod 21 and the latch actuating rod 23 are linked by a wedge clutch arrangement 24. The latch actuating rod 23 is linked to the positioning ring 15 by way of a angular tooth 25, which is located in the positioning ring and which engages penetratingly with an angular groove 26 on the latch actuating rod 23. In regard to the meaning here of angular tooth and angular groove, it is to be understood that both are inclined with respect to the positioning ring 15 and with respect to the latch actuating rod 23 and together they form an angular clutch.

In the embodiment in accordance with FIGS. 5 to 8, the positioning assemblage 11 for each coupling member 8 comprises an individual positioning rod 27 confined to a channel in the chuck body 1 perpendicular to the chuck axis, which is slidable by cylinder-piston assemblages 28 which impinge on the positioning rod 27 from both sides. On the positioning rod 27 there is slidably inserted, in a beveled clutch 29 with a beveled groove 31, the coupling member 8 with a beveled linkage 30 radially arranged with respect to the chuck opening region of the chuck jaws 2 and opposite to the positioning rods 27. This slidability thus imparts to the coupling member 8, despite the firmly fixed position radially of the positioning rod 27, the ability to perform radial gripping or positioning movements along with the rearwards jaw segment 2.2 which is guided by the coupling member 8.

Correspondingly, the beveled groove 31 is radially extended and the recessed region 32 is radially lengthened, these serving to carry within the chuck body 1 the end of the coupling member 8 which is slidably inserted in the positioning rod 27.

In order to obtain exactly the required positioning movement of the actuating member 5 for setting the width of the chuck, a detent 33 is provided, which is positionable within the pathway of the actuating member 5. When the detent is acting, then the stroke of the actuating member 5 is limited to the dimension corresponding to the spacing of a tooth on the forward jaw segment 2.1 and on the coupling member 8. When the detent is not acting, on the other hand, then the actuating member 5 can move all the way to the maximum possible chuck stroke.

In order that the detent 33 can be controlled in this manner, it is constructed as a pin projecting axially towards the actuating member 5 and it sits on a positioning rod 34 which is slidably constrained in the chuck body 1 perpendicular to the chuck axis, this positioning rod being actuated by a controllable cylinder-piston arrangement 36 against the force of a restoring spring 35. In its freedom-allowing position at the maximum possible chuck diameter, the detent 33 inserts into a groove 37 of the beveled clutch 7 on the actuating member 5, so that it is rendered ineffective as a detent. If, on the other hand, the detent 33 is shifted to the position indicated by the dashed lines on FIG. 8, then it comes into position against the rearward piston surface of the actuating member 5 and limits the stroke thereof.

The latching assembly 12 comprises, for each chuck jaw 2, a latching rod 21' which is slidably constrained in the chuck body 1 perpendicular to the chuck axis, with a latching pin 22' which penetrates into the toothed rack 10 on the forward jaw segment 2.1, the latching rod 21' moving against the force of a restoring spring 38 by means of a beveled member 39 which is mounted on a actuating bolt 23'. This actuating bolt 23' is slidably and axially constrained in the chuck body 1, and in turn, it is supported against a positioning bolt 23" which is axial to it and which is constrained slidably in the jaw segment 2.2, so that it is radially slidable during the chuck stroke of the chuck jaw 2; this positioning bolt 23" is coupled, by way of a further actuating member 40, to the coupling member 8.

The slidable relation between the actuating bolt 23' and the positioning bolt 23" makes possible here also the radial sliding of the positioning bolt 23" in relationship to the actuating bolt 23' which is constrained in the chuck body, the positioning bolt 23" being involved in the tightening or adjusting stroke of the chuck.

The actuating member 40 is a guiding bolt which is slidably constrained parallel to the latching rod 21' in the rearward jaw segment 2.2, which in turn, by way of beveled surfaces 41 and 42 is pressed against, on one side, the axially-slidable coupling member 8 and on the other side, the positioning bolt 23". All the beveled surfaces 39, 41 and 42 are so arranged that the axial positioning of the coupling member 8 leads to opposite positioning of the positioning bolt 23" and of the actuating bolt 23' and positioning of the actuating bolt 23' pushes the latching pin 22' into the toothed rack 10.

I claim:
1. A lathe chuck which comprises:
a chuck body;
a multiplicity of chuck jaws located radially to the axis of said chuck body, two jaw segments making up each of said chuck jaws, said jaw segments lying one behind the other in relation to said axis, said jaw segments being displaceable with respect to one another to change the clamping span of said chuck, said displacements being always less than the maximum possible stroke of the chuck jaws;
a coupling member arranged to enable coupling and decoupling of said two jaw segments;
a actuating member axial to said chuck and displaceable to the maximum possible stroke of the chuck jaws, said actuating member being operatively linked to each of the rearward members of said jaw segments;
a positioning assembly for positioning said coupling member between two limiting positions corresponding to the coupled and decoupled condition of said jaw segments; and
a latching assembly for fixing the forward of said jaw segments in respect to said chuck, said latching assembly, said actuating member for said jaws, and said positioning assembly being controllable cooperatively so that said actuating member executes a back-and-forth motion with a stroke the distance of which corresponds to the distance that said rearward jaw segment must move to make possible the coupling of the two said jaw segments, so that thereby said coupling member is, in one of the directions of said stroke, coupled and, in the other direction of said stroke, uncoupled, and during said stroke while the coupling member is uncoupled, said forward jaw segment is fixed to said chuck body.

2. The chuck defined in claim 1 wherein a toothed rack is provided on each of said forward jaw segments and a corresponding toothed rack is provided on each of said coupling member so as to provid means for coupling, and wherein said coupling members are axially slidable constrained coupling bolts, which in said coupled condition cause said toothed rack on said coupling member to engage with said toothed rack on said forward jaw part.

3. The chuck defined in claim 2 wherein said positioning assembly for positioning said coupling member comprises a coaxial positioning ring constrained rotatably in said chuck body, said ring being linked flexibly with a positioning rod which is located tangentially in said chuck body, said positioning rod being slidable and positionable by a cylinder-piston assembly which impinges upon both sides of said positioning rod, and wherein each of said coupling members is provided with a position-controlling wedge and a position-restoring spring, said coupling member being moved by the action of said wedge into the coupled position against the pressure of said spring when said positioning ring is rotated.

4. The chuck defined by claim 2 wherein each of said positioning assemblies for each of said coupling members is provided with its own displaceable positioning rod, said positioning rod being constrained in said chuck body perpendicular to the axis of said chuck, a cylinder-piston assembly impinging on said positioning rod from both sides, said cylinder-piston assembly being provided to slide said positioning rod, and said coupling member being operatively connected to said positioning rod, said coupling member being inserted so as to be slidable radially to the extent of the displacement stroke of said chuck jaw with respect to said positioning rod, all of said cylinder-piston assemblies being commonly controllable.

5. A chuck defined by claim 1 wherein the path defined in said chuck body for said positioning member is provided with a detent which limits the stroke of said positioning member to the distance corresponding to the distance between positions of said rearward jaw segment which permit coupling of said jaw segments.

6. A chuck defined in claim 5 wherein said actuating member is formed as a actuating piston, whereby a beveled clutch is provided to link said actuating piston to said rearward jaw part, and where said detent is formed as a slidably constrained pin, said pin being axially positioned in respect to said actuating member and constrained in said chuck body so as to be slidable perpendicular to said chuck axis, said pin, when in its free position at the maximum possible stroke, penetrating into a groove defined in said beveled clutch on said actuating member.

7. The chuck defined in claim 5 wherein, for positioning of said detent, there is provided a controllably cylinder-piston assembly and a restoring spring against which said assembly moves.

8. The chuck defined in claim 3 wherein said latching assembly for each of said chuck jaws comprises a latching rod, slidably constrained in said chuck body perpendicular to said axis, a latching pin on said latching rod said pin penetratable from the side into said toothed rack on the forward of said jaw segments, a latch actuating rod constrained slidably axially in said chuck body provided for moving said latching rod, said latch actuating rod being actuated by said positioning ring.

9. The chuck defined in claim 8 wherein a beveled clutch is provided to link said latching rod and said latch actuating rod, and a wedge clutch is provided in order to link said latch actuating rod and said positioning ring, said wedge clutch comprising an angular tooth on said positioning ring and an angular groove in said latch actuating rod into which said angular tooth penetrates.

10. The chuck defined in claim 4 wherein said latching assembly for each of said jaws comprises a latching rod constrained in said chuck body slidably perpendicular to the axis of said chuck body, a latching pin attached to said latching rod, said latching pin penetratable from the side into said toothed rack, a restoring spring being provided to exert a restoring force against the motion of said latching rod, a beveled clutch being provided to provide motion to said latching rod, a latch actuating bolt constrained in said chuck body axially slidable being actuated by way of said beveled clutch, said latch actuating bolt being movable radially over the extent of the stroke of said chuck jaw, a positioning bolt parallel to said latch actuating bolt and constrained slidably in the rearward of said jaw segments, said latch actuating bolt being supported against said positioning bolt, and a further actuating member being provided to couple said coupling member with said positioning bolt.

11. The chuck defined in claim 10 wherein said actuating member is a control bolt slidably constrained in said rearward jaw segment parallel to said latching rod, said control bolt fitting against, on one side, said axially-movable coupling member, and on the other side, against said positioning bolt, and beveled clutches being provided to operatively link said control bolt and said positioning bolt, said beveled clutches being so configured that the axial positioning of said coupling member produces concurrent positioning of said positioning bolt, and so that the axial positioning of said actuating bolt pushes said latching pin into said toothed rack.

* * * * *